(12) United States Patent
Rettenmaier et al.

(10) Patent No.: US 7,530,285 B2
(45) Date of Patent: May 12, 2009

(54) TRANSMISSION SELECTOR DEVICE

(75) Inventors: Markus Rettenmaier, Stuttgart (DE);
Michael Sickart, Heimsheim (DE)

(73) Assignee: Dr. Ing. h.c. f. Porsche Aktiengesellschaft, Weissach (DE)

( * ) Notice: Subject to any disclaimer, the term of this patent is extended or adjusted under 35 U.S.C. 154(b) by 303 days.

(21) Appl. No.: 11/645,837

(22) Filed: Dec. 26, 2006

(65) Prior Publication Data

US 2007/0144293 A1 Jun. 28, 2007

(30) Foreign Application Priority Data

Dec. 24, 2005 (DE) ................ 10 2005 062 296

(51) Int. Cl.
*B60K 20/00* (2006.01)
(52) U.S. Cl. ............... 74/473.18; 74/473.21
(58) Field of Classification Search ........... 74/473.18, 74/473.21, 473.33, 473.35, 335, 339
See application file for complete search history.

(56) References Cited

U.S. PATENT DOCUMENTS

| 6,046,673 | A | 4/2000 | Michael et al. | |
| 7,028,575 | B2 * | 4/2006 | Ehrmaier et al. | 74/473.18 |
| 7,219,572 | B2 * | 5/2007 | Syamoto | 74/473.33 |
| 7,322,457 | B2 * | 1/2008 | Giefer et al. | 192/219.4 |
| 2007/0144294 | A1 * | 6/2007 | Sickart | 74/473.18 |

FOREIGN PATENT DOCUMENTS

| DE | 197 14 459 A1 | 10/1998 |
| DE | 197 14 495 A1 | 10/1998 |
| DE | 19714495 A1 | 10/1998 |
| DE | 198 21 361 A1 | 11/1998 |
| DE | 19821361 A1 | 11/1998 |
| DE | 102 06 985 A1 | 8/2003 |
| DE | 10206985 A1 | 8/2003 |
| DE | 102 12 777 A1 | 10/2003 |
| DE | 20 2004 004 151 U1 | 7/2004 |
| DE | 202004004151 U1 | 7/2004 |

OTHER PUBLICATIONS

European Search Report dated May 27, 2008.

* cited by examiner

*Primary Examiner*—Richard W L Ridley
*Assistant Examiner*—Terence Boes

(57) ABSTRACT

A selector device for an automated or automatic transmission, in particular of a motor vehicle, has a selector lever which is adjustable in an automatic selector gate to switch between automatic operating positions and can be moved via a transverse gate into a tip-action selector gate in which it is adjustable to shift between transmission gears. Here, the selector lever has one stable operating position in the tip-action selector gate, to which stable operating position the selector lever automatically returns from all the labile positions of the three gates. To increase operating comfort and to increase operational safety, a transmission controller is configured such that, after an automatic operating position is selected, it only switches to the selected automatic operating state when the selector lever resumes its stable operating position.

18 Claims, 1 Drawing Sheet

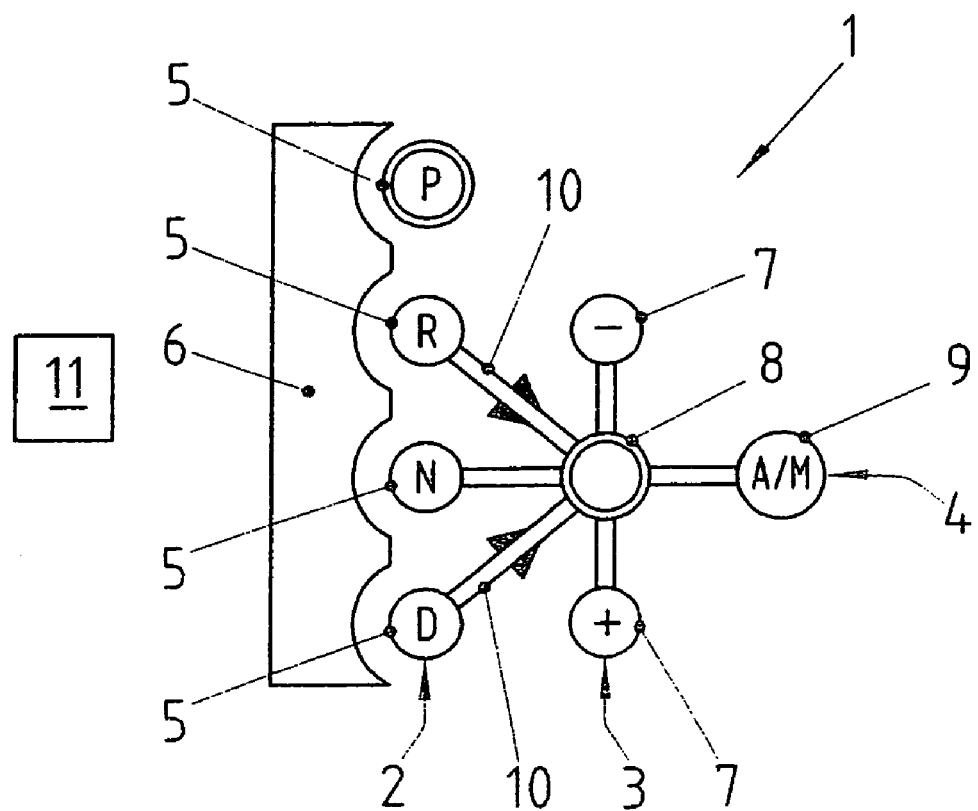

TRANSMISSION SELECTOR DEVICE

CROSS-REFERENCE TO RELATED APPLICATION

This application claims the priority, under 35 U.S.C. §119, of German application DE 10 2005 062 296.8, filed Dec. 24, 2005; the prior application is herewith incorporated by reference in its entirety.

BACKGROUND OF THE INVENTION

Field of the Invention

The present invention relates to a selector device for an automated or automatic transmission, in particular of a motor vehicle. The selector device has a selector lever which is adjustable in an automatic selector gate to switch between automatic operating positions. The selector device can also be moved via a transverse gate into a tip-action selector gate in which it is adjustable to shift between transmission gears. The selector lever has one stable operating position in the tip-action selector gate, to which stable operating position the selector lever automatically returns from all the labile positions of the three gates.

A selector device of this type is known from German Utility Model DE 20 2004 004 151 U1 and contains a selector lever which is adjustable in an automatic selector gate to shift between automatic operating positions, and can be moved via a transverse gate into a tip-action selector gate in which it is adjustable to shift between transmission gears. The selector lever has one stable operating position in the tip-action selector gate, to which stable operating position the selector lever automatically returns from all the labile positions of the three gates.

In the known selector device, the automatic selector gate contains a forward operating position, a reverse operating position and an idle operating position which is situated between the operating positions and is positioned in the point of intersection between the transverse gate and the automatic selector gate. In addition, the stable operating position is positioned in the point of intersection between the transverse gate and the tip-action selector gate. To activate the forward operating mode, the selector lever must be moved from the stable operating position via the idle operating position into the forward operating position. After the selector lever is released, it automatically returns via the idle operating position to the stable operating position. Here, in order to avoid incorrect shifts, the selector lever in the known selector device is configured as a tip-action selector which must be depressed in order to activate the respectively selected operating position. As a result, merely arriving at or traversing an operating position cannot immediately lead to its activation.

Another selector device, in which a selector lever can be moved via a transverse gate from an automatic selector gate into a tip-action selector gate, is known from published, non-prosecuted German patent application DE 197 14 459 A1. Here, the two intersecting points between the three gates each form stable positions, while the remaining selector positions form unstable positions from which the selector lever automatically returns to the respectively adjacent stable selector position.

A further selector device is known from published, non-prosecuted German patent application DE 102 06 985 A1, corresponding to U.S. Pat. No. 7,028,575 B2. In this selector device, a selector lever can be adjusted into two selector gates, which are connected to one another by a transverse gate, in order to select transmission gears or automatic operating states. The known selector device is monostable and has only one stable position for the selector lever. To select a transmission gear or an automatic operating state, the selector lever is deflected manually out of its stable position in one or the other selector gate into the respective desired selector position. The selector lever subsequently returns to the stable position automatically after being released from any of the possible deflected positions.

SUMMARY OF THE INVENTION

It is accordingly an object of the invention to provide a transmission selector device that overcomes the above-mentioned disadvantages of the prior art devices of this general type, which is distinguished in particular by being easy to operate and preferably by a high degree of operational safety, for a selector device of the type stated in the introduction.

In a first solution, the invention is based on the general concept of activating the transmission gear or operating state selected by the actuation of the selector lever only once the selector lever has returned to its stable operating position. This avoids an inadvertent activation of an undesired operating state.

In a second solution, which can be implemented alternatively or in addition to the first solution, the invention is based on the general concept of providing at least one one-way gate, via which the selector lever can be moved from the automatic selector gate into the tip-action selector gate or into the stable operating position while bypassing the transverse gate. This makes it possible in particular to bypass a labile operating position which is disposed in the point of intersection between the automatic selector gate and the transverse gate. The labile operating position which can be bypassed in this way therefore cannot be inadvertently activated when returning the selector lever. This configuration also provides that the selector lever need not be configured as a tip-action selector, thus increasing operating comfort.

It is self-evident that the features stated previously and those which are yet to be explained can be used not only in the respectively specified combination but also in other combinations or individually without departing from the scope of the present invention.

Other features which are considered as characteristic for the invention are set forth in the appended claims.

Although the invention is illustrated and described herein as embodied in a transmission selector device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a circuit diagram of a selector device according to the invention.

DESCRIPTION OF THE PREFERRED EMBODIMENTS

Referring now to the single FIGURE of the drawing in detail, therein is shown a selector device 1 according to the invention which contains a non-illustrated selector lever, an automatic selector gate 2, a tip-action selector gate 3 and a transverse gate 4. The automatic selector gate 2 and the tip-action selector gate 3 are aligned parallel to one another, while the transverse gate 4 is aligned substantially perpendicular to the two other gates 2, 3 and intersects the two other gates 2, 3 in two points of intersection.

The selector device 1 serves to electrically or electronically actuate a non-illustrated automatic or automated transmission, a so-called shift-by-wire transmission. In addition, the transmission is conventionally a load shift transmission, which can be shifted under load without the vehicle driver having to actuate a clutch for this purpose.

A plurality of automatic operating positions 5 are disposed in the automatic selector gate 2. These are conventionally at least an idle operating position N, a forward operating position D and a reverse operating position R. In the present case, a park or rest operating position P is additionally provided. In the stable rest position P, a parking lock of the transmission is activated, so that the vehicle equipped with the transmission cannot roll away.

The idle operating position N is expediently positioned in a point of intersection between the transverse gate 4 and the automatic selector gate 2. At the same time, the idle operating position N is disposed between the forward operating position D and the reverse operating position R, so that a shift between a forward operating state and a reverse operating state and vice versa is only possible via the idle operating position N. In addition, the reverse operating position R is positioned here between the rest operating position P and the idle operating position N.

Here, the selector device 1 is also equipped with a notched device 6 which is assigned to the automatic selector gate 2. The notched device 6 is configured so as to provide a person actuating the selector lever by hand with a haptic indication of when the selector lever arrives at or traverses one of the automatic operating positions 5. The notched device 6 generates, for example, resistance forces which counteract the adjusting movement and are dependent on the respective position of the selector lever.

The tip-action selector gate 3 has two tipping positions 7, specifically a minus position provided for downshifting and a plus position provided for upshifting. The tip-action selector gate 3 additionally contains a stable operating position 8. The latter is expediently positioned in the point of intersection between the tip-action selector gate 3 and the transverse gate 4. The stable operating position 8 is additionally disposed between the two tipping positions 7.

The selector device 1 in the preferred embodiment shown here is finally provided with a switching position 9 which is disposed in the transverse gate 4, specifically at the opposite side of the transverse gate 4 from the automatic selector gate 2 with respect to the tip-action selector gate 3. Accordingly, the stable operating position 8 is disposed between the idle operating position N and the switching position 9. The switching position 9 serves to switch between an automatic mode A and a manual mode M. In the automatic mode A, the vehicle driver can, in a forward operating state, temporarily change the current gear position of the transmission by actuating the selector lever. For this purpose, the vehicle driver moves the selector lever from the stable operating position 8 into the minus position to shift down and into the plus position to shift up. In the manual mode M, the vehicle driver must, at least when traveling forward, shift all the transmission gears himself by moving the selector lever into the minus position or into the plus position.

The selector lever is adjustable in the gates 2, 3, 4, whereby the individual automatic operating position 5 of the automatic selector gate 2 and the individual tipping positions 7 of the tip-action selector gate 3 and also the switching position 9 of the transverse gate 4 can be selected.

The stable operating position 8 is characterized in that the selector lever automatically returns to the stable operating position 8 from all the labile positions of the three gates 2, 3, 4. This is achieved, for example, by corresponding spring devices. The idle operating position N, the reverse operating position R and the forward operating position D are preferably configured as labile operating positions. The two tipping positions 7 and—if provided—the switching position 9 are likewise configured as labile positions. In the preferred embodiment shown here, in addition to the stable operating position 8, only the rest position P is configured as a stable position, though the rest position P, in contrast to the stable operating position 8, does not have a return function, that is to say when the selector lever is deflected out of the rest position P, it does not automatically return to the rest position P but must always be adjusted manually into the rest position P, in which it then however automatically remains. The two stable positions are symbolized in the FIGURE by double circles, while the labile positions are indicated by single circles.

The selector device 1 according to the invention is additionally distinguished by at least one one-way gate 10. In the present case, two such one-way gates 10 are provided. Each one-way gate 10 connects a labile operating position 5, which is situated outside the transverse gate 4, to the tip-action selector gate 3 or to the stable operating position 8. The selector lever can be adjusted through the one-way gates 10 in only one direction, specifically towards the stable operating position 8, and not in the opposite direction. As a result of the one-way function of the one-way gates 10, the selector lever can move from the tip-action selector gate 3 or from the stable operating position 8 into the automatic selector gate 2 only via the transverse gate 4. In the configuration shown here, it is therefore necessary in any case to arrive at or traverse the idle operating position N in order to select an automatic operating position 5. If the selector lever is then released after the selection of a labile operating position situated outside the transverse gate 4, that is to say here the forward operating position D or the reverse operating position R, the selector lever automatically returns via the respective one-way gate 10 to the stable operating position 8. The automatic return process therefore does not take place via the transverse gate 4 and therefore not via the operating position 5 arranged therein, that is to say the idle operating position N. An inadvertent actuation of the operating position 5 which is bypassed in this way, that is to say the idle operating position N, is therefore avoided. The activated operating state is therefore always that from whose operating position 5 the selector lever automatically returns to the stable operating position 8.

In an alternative embodiment of the selector device 1 according to the invention, which can however also be implemented in addition to the previously described embodiment, it is possible for a transmission controller 11 (indicated only symbolically) to be provided which correspondingly actuates the transmission as a function of the selection processes executed with the selector lever. According to the invention, the transmission controller 11 is configured such that, after an automatic operating position 5 is selected by the selector lever, it only activates the selected automatic operating position 5 when the selector lever resumes its stable operating position 8. This ensures, for example when the selector lever moves into and pauses in the idle operating position N, that the latter is activated not as a result of this action alone, but only when the selector lever returns again to the stable operating position 8. It is therefore possible, primarily in conjunction with the one-way gates 10, for a high degree of operational reliability to be attained, with undesired selector states being substantially avoided.

In a particularly advantageous refinement, the transmission controller 11 can be configured, independently of the previously described selector delay, such that it activates a rock-free mode if the selector lever is adjusted directly from the forward operating position D via the idle operating position N into the reverse operating position R or vice versa. In the present context, a "direct adjustment" occurs if the adjustment takes place without the selector lever temporarily returning to the stable operating position 8. The rock-free mode permits a fast change in the direction of travel of a vehicle which is still stationary in order to release the vehicle, which has become trapped in the terrain or in snow, by alternating forward and rearward thrusts. The reciprocating vehicle movement is referred to as "rocking free".

The rock-free mode is activated by the transmission controller 11 in particular if, after a direct shift between the forward operating position D and the reverse operating position R, the selector lever does not return, or does not return within a predetermined time, to the stable operating position 8. The rock-free mode is expediently maintained until the selector lever returns again to the stable operating position 8.

During the rock-free mode, the vehicle can switch particularly rapidly between the two directions of travel, with this taking place in particular at a reduced level of engine power of the vehicle.

We claim:

1. A selector device for an automated or automatic transmission, the selector device comprising:
   an automatic selector gate having automatic operating positions;
   a transverse gate;
   a tip-action selector gate;
   a selector lever adjustable in said automatic selector gate to switch between said automatic operating positions, said selector lever being moved via said transverse gate into said tip-action selector gate in which said selector lever being adjustable to shift between transmission gears, said selector lever having one stable operating position in said tip-action selector gate, said selector lever automatically returning to said stable operating position from all labile positions of said automatic selector gate, said transverse gate, and said tip-action selector gate; and
   a transmission controller configured such that, after one of said automatic operating positions is selected, said transmission controller only allows a switching to a selected automatic operating state when said selector lever resumes said stable operating position.

2. The selector device according to claim 1, further comprising at least one one-way gateway, said selector lever can be moved from said tip-action selector gate into said automatic selector gate only via said transverse gate, and said selector lever can be moved from said automatic selector gate into said tip-action selector gate via said transverse gate and additionally via said at least one one-way gate.

3. The selector device according to claim 2, wherein said automatic operating positions include a forward operating position configured as one of said labile positions.

4. The selector device according to claim 2, wherein said automatic operating positions include a reverse operating position configured as one of said labile positions.

5. The selector device according to claim 2, wherein a separate one of said at least one one-way gate, by which said selector lever can move back to said tip-action selector gate, is provided for each said automatic operating positions, each configured as one of said labile positions, of said automatic operating positions situated outside said transverse gate.

6. The selector device according to claim 2, wherein said selector lever automatically returns from a respective one of said automatic operating positions, configured as one of said labile positions, of said automatic operating positions situated outside said transverse gate only through said one-way gate assigned to said respective automatic operating position.

7. The selector device according to claim 2, wherein said automatic operating positions include an idle operating position positioned in a point of intersection between said transverse gate and said automatic selector gate and is configured as one of said labile positions, said automatic operating positions further contain at least one further operating position configured as one of said labile positions and from which said selector lever can be moved back to said tip-action selector gate via said at least one one-way gate.

8. The selector device according to claim 2, wherein:
   a separate one of said at least one one-way gate, by which said selector lever can move back to said tip-action selector gate, is provided for each of said automatic operating positions, each configured as one of said labile positions, of said automatic operating positions situated outside said transverse gate;
   said selector lever automatically returns from a respective one of said automatic operating positions situated outside said transverse gate only via said one-way gate assigned to said respective operating position;
   said automatic operating positions include a forward operating position configured as one of said labile positions; and
   said automatic operating positions include a reverse operating position configured as one of said labile positions.

9. The selector device according to claim 8, wherein:
   said one-way gate moves said selector lever from said automatic selector gate into said stable operating position; and
   said stable operating position is positioned in a point of intersection between said tip-action selector gate and said transverse gate.

10. The selector device according to claim 8, wherein said one-way gate moves said selector lever from said automatic selector gate into said stable operating position.

11. The selector device according to claim 8, wherein said stable operating position is positioned in a point of intersection between said tip-action selector gate and said transverse gate.

12. The selector device according to claim 1, wherein said selector lever has a stable rest position in which a parking lock of the transmission is activated.

13. The selector device according to claim 1, wherein said selector lever has a labile switching position, for switching between an automatic mode and a manual mode, disposed in said transverse gate.

14. The selector device according to claim 13, wherein said stable operating position is positioned in said transverse gate between said labile switching position and said automatic selector gate.

15. The selector device according to claim 1, wherein said transmission controller switches to a rock-free mode in an event of a direct shift between a forward operating position and a reverse operating position of said automatic operation positions, said transmission controller permitting an engagement in each case of the corresponding transmission gear if, and as long as, said selector lever does not return to the stable operating position.

16. The selector device according to claim 1, further comprising a notched device disposed on said automatic selector gate and provides a haptic indication of when said automatic operating positions are attained and traversed.

17. The selector device according to claim 1, wherein the selector device is part of a motor vehicle.

18. The selector device according to claim 1, wherein said automatic selector gate has a stable rest position in which a parking lock of the transmission is activated when said selector lever is positioned in said stable rest position.

* * * * *